United States Patent [19]

Mantovani et al.

[11] 4,069,402
[45] Jan. 17, 1978

[54] REMOTE-TESTING ARRANGEMENT FOR PCM TRANSMISSION SYSTEM

[75] Inventors: Pietro Mantovani, San Secondo (Parma); Silvio Roldi, Milan, both of Italy

[73] Assignee: Societe Italiana Telecomunicazioni Siemens S.p.A., Milan, Italy

[21] Appl. No.: 709,445

[22] Filed: July 28, 1976

[30] Foreign Application Priority Data

July 28, 1975 Italy ................................ 25817/75

[51] Int. Cl.² ............................................. H04B 3/46
[52] U.S. Cl. ........................................ 179/175.31 R
[58] Field of Search ............... 179/175.3 R, 175.31 R

[56] References Cited

U.S. PATENT DOCUMENTS

| 3,692,964 | 9/1972 | Camiciottoli et al. ...... 179/175.31 R |
| 3,739,098 | 6/1973 | Camiciottoli et al. ...... 179/175.31 R |
| 3,764,760 | 10/1973 | Marchini ...................... 179/175.31 R |

*Primary Examiner*—Kathleen H. Claffy
*Assistant Examiner*—Randall P. Myers
*Attorney, Agent, or Firm*—Karl F. Ross

[57] ABSTRACT

Two sets of line terminals in a pair of PCM head stations are interconnected by a set of transmission channels via a number of cascaded relay stations each including a line repeater for each channel. A service link extends from an address generator in one head station to a monitoring unit in each relay station, the monitoring unit including a regenerating circuit for throughgoing address codes and further including a discriminating network which, upon detecting an address code identifying that relay station, sends a sinusoidal priming signal to all the associated repeaters. A predetermined PCM test code, e.g. one containing a certain number of consecutive zeroes, is simultaneously transmitted from the same head station over the channel containing a selected repeater to be checked which, upon coincidence of the test code with the priming signal from the associated monitoring unit, closes a loop for feeding back the test code to the originating line terminal.

10 Claims, 4 Drawing Figures

REMOTE-TESTING ARRANGEMENT FOR PCM TRANSMISSION SYSTEM

FIELD OF THE INVENTION

My present invention relates to a remote-testing arrangement for a set of two-way transmission channels extending between two head stations of a pulse-code-modulation (PCM) telecommunication system, with interposition of a number of cascaded relay stations each including a line repeater for each channel.

BACKGROUND OF THE INVENTION

In commonly owned U.S. Pat. No. 3,692,964, issued in the names of Roberto Camiciottoli and Maurizio Palombari, there has been disclosed a remote-testing arrangement for the repeaters of such a PCM channel by which an identification code individual to a selected repeater is sent out from a PCM terminal at one end of the channel and is picked up by the repeater for which it is intended, the repeater being for this purpose equipped with a decoder which controls the closure of a loop over the incoming and outgoing signal paths of the channel upon recognizing the assigned code. This code is then sent back over the loop, as a test signal, to the originating terminal in order to facilitate an evaluation of the repeater concerned.

Such a remote-testing arrangement, though satisfactory in principle, is relatively complex and includes energy-dissipating components such as shift registers so that its rate of power consumption differs but little from that of the supervised telecommunication system itself. Safety regulations in some countries require that currents transmitted over longdistance lines be limited to a few tens of milliamperes, e.g. 40 mA; this limit is somewhat difficult to observe in high-speed switching systems in which semiconductors are turned on and off at rates corresponding to the usual bit frequency of about 2 Mbit/sec. Furthermore, the need for differentiating between test codes assigned to the various repeaters of a channel restricts the choice of available code signals and reduces the flexibility of the system inasmuch as such test codes must have certain characteristics distinguishing them from the normally transmitted message codes.

OBJECT OF THE INVENTION

The object of our present invention, therefore, is to provide an improved remote-testing arrangement of the character discussed above which obviates the aforestated drawbacks and satisfies the requirements for low-power operation.

SUMMARY OF THE INVENTION

We realize this object, in accordance with our present invention, by the provision of a service link extending from at least one head station (termed master station) to all the relay stations lying athwart the several two-way transmission channels (referred to hereinafter as lines), each relay station including a monitoring unit connected to the service link and provided with discriminating means responsive to an address code individual to this relay station arriving from a signal generator at the master station. A priming signal generated by the discriminating means, upon recognition of the corresponding address code, is delivered to all the line repeaters of the relay station; at the same time, a predetermined test code (which may be the same for all the repeaters of the system) is sent out from the master station over the line or lines whose repeaters within the addressed relay station are to be checked. A receiver at each repeater detects this test code and thereupon produces an internal recognition signal which, together with the simultaneously arriving priming signal from the associated monitoring unit, actuates a loop-closing switch in order to send back the test code for evaluation of the performance of the repeater by equipment of the type described in the aforementioned U.S. Pat. No. 3,692,964.

Advantageously, pursuant to a further feature of our invention, the monitoring units of at least the first $(k-1)$ relay stations in a set of $k$ such stations (as counted from the master station) are each provided with regenerating circuitry, inserted between an incoming section and an outgoing section of the service link, for repristinating an arriving address code before sending it on to the next-following relay station. Obviously, such regeneration will not be needed in the last relay station unless a code coming from the master station may also be intended for the testing of equipment in the other head station.

The test code received by all the line repeaters of a selected channel may be characterized by an unbroken sequence of bits of the same type, preferably zeroes, whose number may vary between certain tolerance limits and which recurs at a rate ranging between predetermined frequency limits. The receiving unit of each line repeater comprises in that case a pair of cascaded timing networks for measuring the length of such a sequence and determining its recurrence rate.

BRIEF DESCRIPTION OF THE DRAWING

The above and other features of our invention will now be described in detail with reference to the accompanying drawing in which.

SPECIFIC DESCRIPTION

Figure 1:
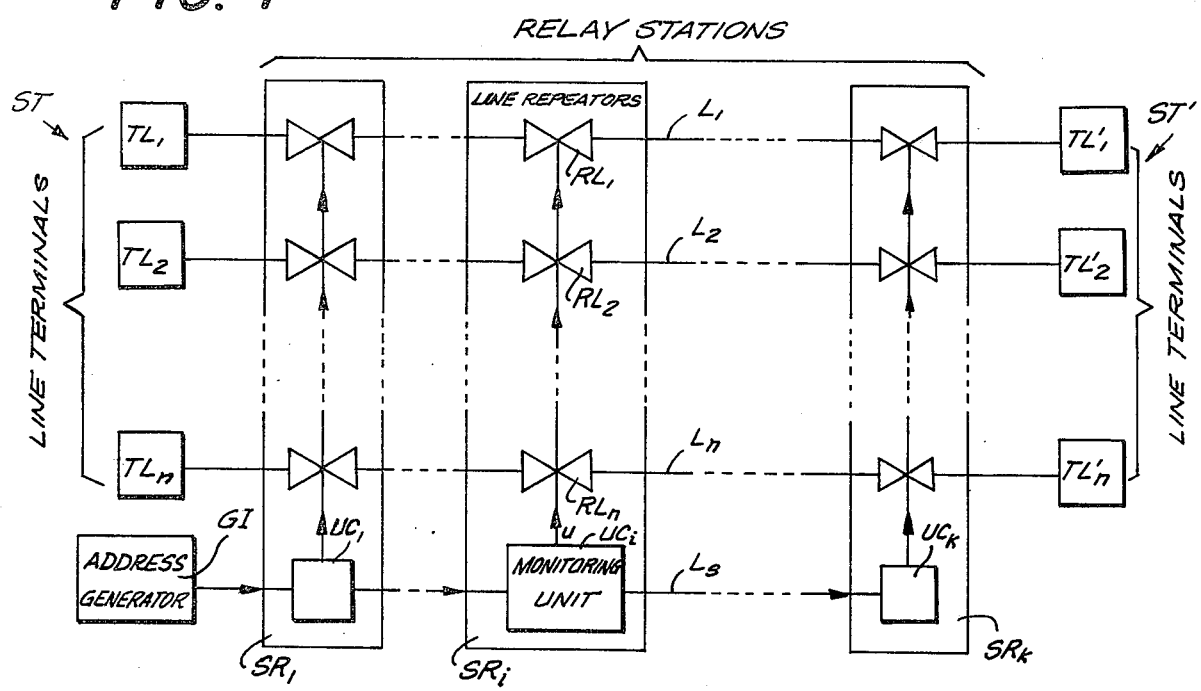
FIG. 1 is a block diagram of a PCM telecommunication system embodying a remote-testing arrangement according to our invention.

In FIG. 1 we have shown a telecommunication system with two head stations ST and ST' each comprising a multiplicity of PCM line terminals $TL_1, TL_2, \ldots TL_n$ and $TL'_1, TL'_2, \ldots TL'_n$ interconnected by respective two-way transmission lines $L_1, L_2, \ldots L_n$ passing through a number of relay stations $SR_1, \ldots SR_i, \ldots SR_k$ in cascade. Each relay station comprises a monitoring unit $UC_1, \ldots UC_i, \ldots UC_k$ as well as a set of $n$ repeaters, one for each line, designated $RL_1, RL_2, \ldots RL_n$ in relay station $SR_i$ which is representative of all the relay stations except for the omission of certain circuit elements in monitoring unit $SR_k$. The repeaters and monitoring unit of each relay station are mounted in a common housing indicated only diagrammatically.

The system shown in FIG. 1 further comprises a service line $L_s$ extending from an address generator GI in master station ST to all the monitoring units $UC_1 - UC_k$. As will be apparent from FIG. 2, this service line is not continuous but comprises incoming sections terminating at primary windings of input transformers $TR_1$ and outgoing sections originating at secondary windings of output transformers TR$_2$ of the several monitoring units (unit SR$_k$ has no output transformer). Each monitoring unit has an output lead U connected in parallel to all the associated line repeaters.

Figure 2:
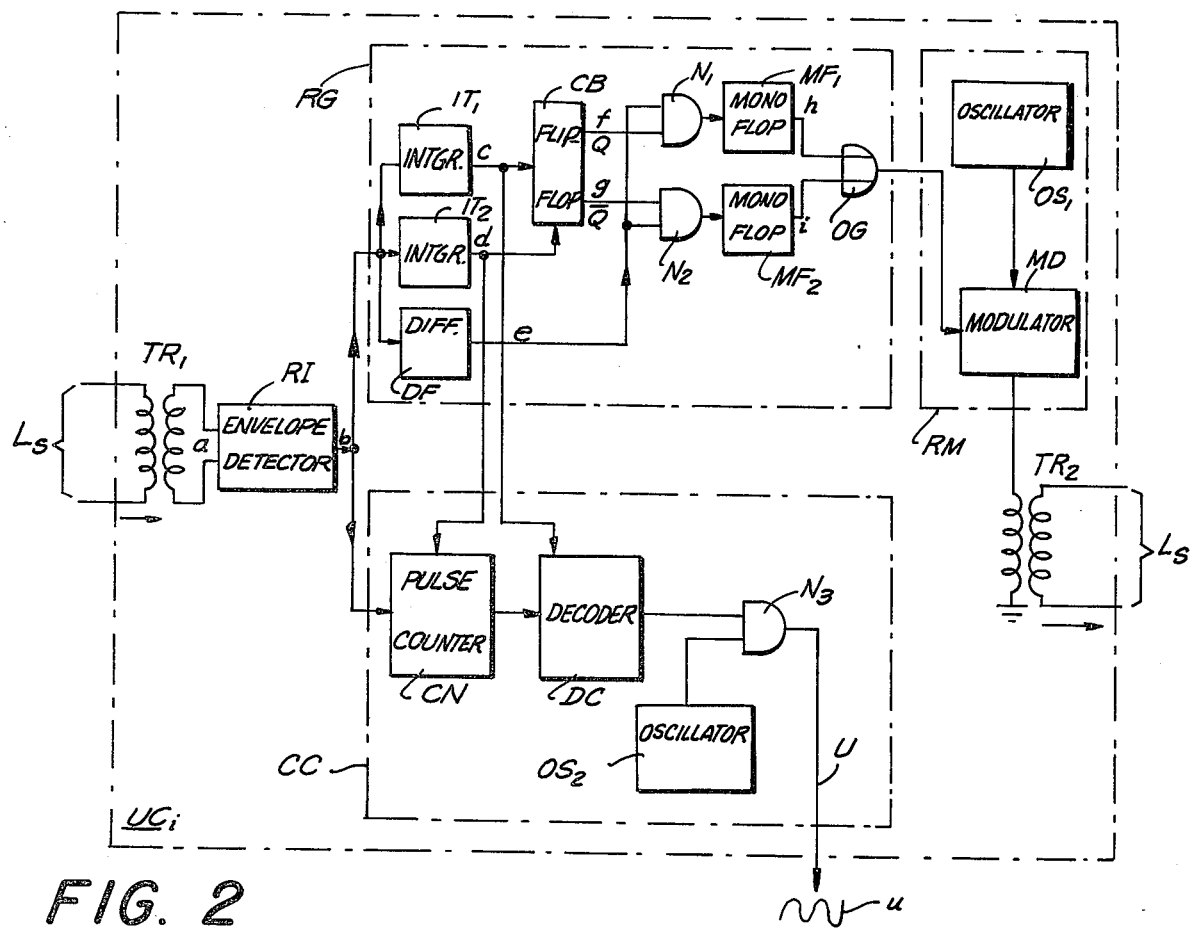
FIG. 2 is a more detailed circuit diagram of a monitoring unit included in the system of FIG. 1.
Figure 4:
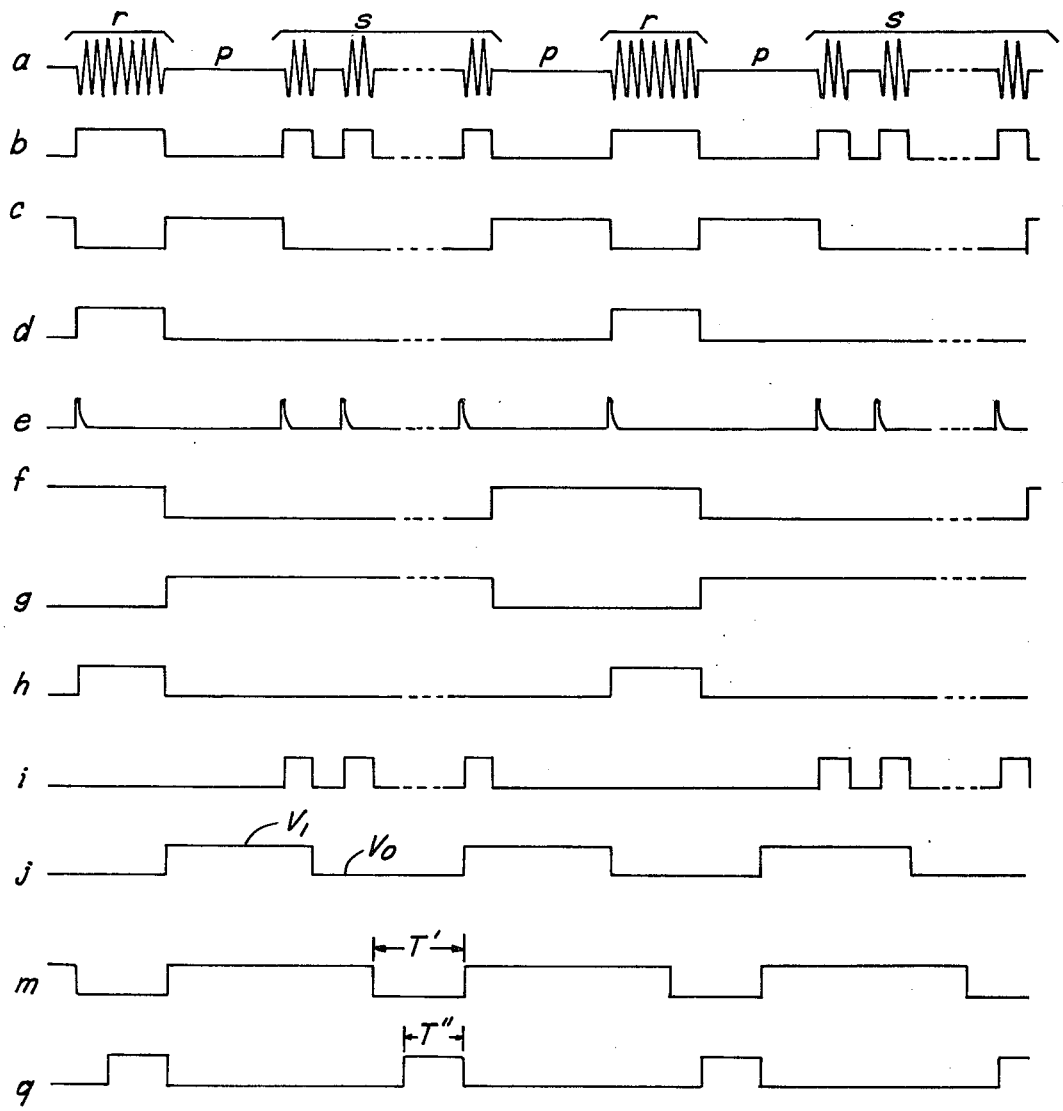
FIG. 4 is a set of graphs relating to the operation of the units of FIGS. 2 and 3.

Representative monitoring unit UC$_i$ is shown in FIG. 2 to comprise an envelope detector RI connected across the secondary winding of input transformer TR$_1$ for demodulating an incoming high-frequency carrier $a$ which is amplitude-modulated with an address code as illustrated in the correspondingly designated first graph of FIG. 4. This address code is a binary signal $b$ appearing in the detector output as a voltage alternating between a low and a high level, as depicted in the second graph of FIG. 4. The address code comprises a start or resetting pulse $r$ followed by a pause $p$ of approximately the same duration, serving as a guard interval. Between this pause $p$ and another one of the same length there occurs a square wave $s$ with a number of cycles, much shorter than pulse $r$ or pause $p$, identifying the desired relay station. This code is repeated several times.

The detector output carrying the signal $b$ is connected in parallel to a regenerating circuit RG and a counting circuit CC. Circuit RG comprises an inverting integrator IT$_1$, another integrator IT$_2$ and a differentiator DF all connected in parallel to the detector output. Integrator IT$_1$ has a time constant large enough to bridge the short intervals separating successive identification pulses of square wave $s$ so that its output carries a pulse train $c$ as shown in the third graph of FIG. 4, with high voltage only during the guard intervals $p$. Integrator IT$_2$ has a higher response threshold so that its output carrying a signal $d$ is energized only during the occurrence of a start pulse $r$, as indicated in the fourth graph of FIG. 4. Output signal $e$ of differentiator DF is a succession of spikes coinciding with the leading edge of each positive-going pulse of the code signal $b$, this spike being fed to respective inputs of a pair of AND gates N$_1$ and N$_2$. A flip-flop CB is settable by positive-going voltage of signal $c$ and resettable by negative-going voltage of signal $d$, with the latter overriding the former, so as to produce two pulse trains $f$, $g$ on its set and reset outputs Q and $\overline{Q}$ respectively connected to the other inputs of AND gates N$_1$ and N$_2$; these pulse trains are illustrated in the sixth and seventh graphs of FIG. 4. AND gate N$_1$, when conducting at the beginning of each start pulse $r$, trips a monoflop MF$_1$ whose off-normal period equals that of the undistorted start pulse; similarly, AND gate N$_2$ conducts at the beginning of each identification pulse and trips a monoflop MF$_2$ whose off-normal period equals half a cycle of square wave $s$. Output signals $h$ and $i$ of monoflops MF$_1$ and MF$_2$, depicted in the eighth and ninth graphs of FIG. 4, are combined in an OR gate OG delivering a replica of the original address code to a modulation circuit RM which includes a local oscillator OS$_1$ working into an amplitude modulator MD. The latter, receiving the output signal of OR gate OG, thus reconstitutes the incoming address signal for retransmission to the next-following relay station via output transformer TR$_2$. The operating frequency of oscillator OS$_1$ need not necessarily be identical with that of the carrier received via input transformer TR$_1$. Circuits RG and RM are omitted in monitoring unit UC$_k$ of the last relay station SR$_k$.

Circuit CC includes a pulse counter CN which is reset to zero, during each start pulse $r$, by the output signal $d$ of integrator IT$_2$ and which thereupon counts the identification pulses of square wave $s$, feeding its count to a decoder DC which is blocked except in the presence of the output signal $c$ of integrator IT$_1$ so as to be operative only during the guard interval $p$ immediately following that square wave. Decoder DC, when unblocked by this signal $c$, energizes an input of an analog coincidence gate N$_3$ if the pulse count received from element CN matches its own fixed setting. Gate N$_3$ then passes a sine wave $u$, generated by a local oscillator OS$_2$, to output lead U as a priming signal for all the associated repeaters.

Figure 3:
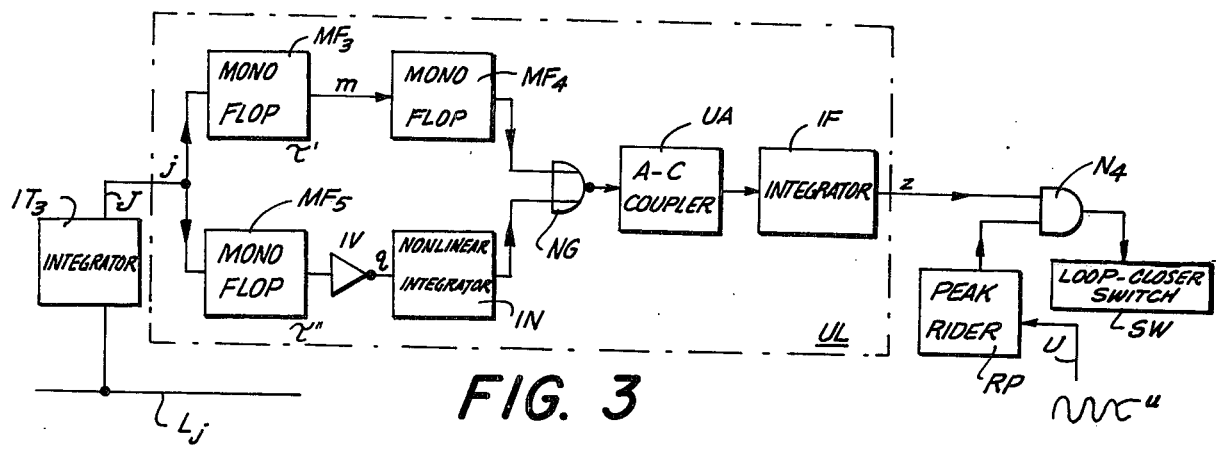
FIG. 3 is a circuit diagram of a receiving unit of an individual line repeater in that system.

A receiving unit UL of each repeater, shown in FIG. 3, has an input lead J to which a binary test code $j$ is delivered from the corresponding line terminal in master station ST concurrently with the emission of an address code by generator GI (FIG. 1). This input lead J is coupled to the associated transmission line L$_j$ via an integrator IT$_3$ which, as shown in the tenth graph of FIG. 4, produces a high voltage V$_1$ as long as bits of logical value "1" alternate more or less regularly with bits of logical value "0"; in the presence of a prolonged series of zeroes, signal $j$ has a low voltage V$_0$. The test code here contemplated by way of example has, ideally, 25 consecutive zeroes in a word of $2^9 - 1 = 511$ bits recurring at a cadence of $2,048,000 \div 511 = 4,008$ Hz, with tolerance ranges of 20 to 40 for the number of zeroes in the sequence and of 2.5 to 6 KHz for its recurrence rate. The remaining bits of the test code $j$ may be chosen from a diversity of pseudo-random or periodically recurrent combinations, according to the type of test desired. If the PCM signals are of the bipolar type, they could include bipolarity violations in order to determine the response of the repeater. They could also be regular PCM message signals of a multiplexer frame in which selected time slots, assigned to a telecommunication channel to be tested, are blanked under the control of a time-division-multiplex center programmed to carry out such tests in a certain order on all the associated PCM channels.

Signal $j$ is fed, in parallel, to two monoflops MF$_3$ and MF$_5$ forming a first-stage timing network. Monoflop MF$_3$ is of the retriggerable type and has an off-normal period $\tau'$ equal to 20 bits or about 10 $\mu$sec so as to energize its output lead with a signal $m$ for a 20-bit period after each transition from high voltage V$_1$ to low voltage V$_0$ (graph $j$ in FIG. 4); with 25 consecutive zeroes occurring during the low-voltage interval of graph $j$, signal $m$ — shown in the 11th graph of FIG. 4 — remains off for a period T' = (25−20)T$_0$ where T$_0$ is the length of a bit. Monoflop MF$_5$ has a longer off-normal period $\tau''$, corresponding to 40 bits, and works into an invester IV whose output signal $q$ (shown in the bottom graph of FIG. 4) thus remains on for a period T'' = (N−40)T$_0$ where N is a number of consecutive zeroes exceeding the upper tolerance limit of 40.

A second-stage timing network comprises a monoflop MF$_4$, tripped by the signal $m$, and a nonlinear integrator IN receiving the signal $q$. Monoflop MF$_4$ is also retriggerable and generates a continuous output voltage when the off-period T' of signal $m$ recurs at a higher rate than 6 kHz. Integrator IN charges rapidly in response to a pulse of signal $q$ and discharges very slowly so as to have an output for an extended time, e.g. of several 511-bit cycles, whenever an excessive number of consecutive zeroes appears on lead J, be it because of an interruption of transmission on account of a malfunction or for some other reason.

Monoflop MF$_4$ and integrator IN work into respective inputs of a NOR gate NG which thus conducts only when neither of these elements has an output. An alternating-current coupler UA, which may comprise a transformer or a blocking condenser, transmits nothing but a pulsating output voltage of monoflop $MF_4$ to a final integrator IF, such a pulsating voltage occurring only when signal $m$ has an off-period $T'$ recurring at a rate of less than 6KHz. If that rate is less than 2.5 KHz, which is the lower limit of the predetermined frequency range here assumed, integrator IF does not respond.

If a proper test code is picked up by receiving unit UL, an output lead of integrator IF is energized with a recognition signal $z$ and unblocks an AND gate $N_4$ having an input connected to a peak rider or envelope detector RP which receives the sinusoidal priming signal $u$ over lead U from monitoring unit UC; since signal $u$ is either present or absent, circuit RP has a binary output. The resulting conduction of gate $N_4$ actuates a loop-closing switch SW which causes the bit stream on line $L_j$ to be sent back to the originating line terminal for testing purposes, in the general manner described in U.S. Pat. No. 3,692,964 referred to above.

We claim:

1. In a pulse-code-telecommunication system including a pair of head stations interconnected by a set of parallel two-way transmission channels, a set of line terminals at each head station respectively connected to said transmission channels, and a plurality of cascaded relay stations between said head stations, each relay station encompassing a set of line repeaters respectively inserted in said channels, the line terminals of one head station being adapted to transmit over the associated channel a test code for checking a selected line repeater inserted therein, each line repeater being provided with loop-closing means for retransmitting said test code to the originating line terminal, the combination therewith of:
a service link extending from said one head station to all said relay stations;
a monitoring unit at each relay station connected to said service link;
signal-generating means at said one head station connected to said service link for transmitting thereover an address code identifying the monitoring unit of a relay station containing the selected line repeater;
discriminating means at each monitoring unit responsive to the corresponding address code for delivering a priming signal to all the line repeaters of the relay station so addressed;
receiving means at each line repeater responsive to said test code for emitting a recognition signal; and
coincidence means at each line repeater connected to said receiving means and to said monitoring unit for operating said loop-closing means under the joint control of said priming and recognition signals.

2. The combination defined in claim 1 wherein the number of said relay stations is $k$, the monitoring units of at least the first ($k$-1) relay stations closest to said one head station being each provided with input means connected to an incoming section of said service link, output means connected to an outgoing section of said service link and regenerating circuitry inserted between said input and output means.

3. The combination defined in claim 2 wherein said service link is adapted for the transmission of a carrier wave amplitude-modulated with said address code by said signal-generating means, said input means including an envelope detector with output connections to said discriminating means and to said regenerating circuitry.

4. The combination defined in claim 3 wherein said address code is a pulse sequence including a recurrent series of relatively short identification pulses and a relatively long start pulse at the beginning of each series, said discriminating means including a pulse counter connected to be stepped by said identification pulses and reset by said start pulse.

5. The combination defined in claim 4 wherein said regenerating circuitry includes a first integrator with a response threshold distinguishing between said start and identification pulses on the one hand and intervening guard intervals on the other hand, a second integrator responsive only to said start pulse, a differentiator connected to said envelope detector in parallel with said integrators for generating a spike at the beginning of each start and identification pulse, first timing means jointly controlled by said integrators and said differentiator for producing a replica of said start pulse, and second timing means jointly controlled by said integrators and said differentiator for producing a replica of each identification pulse.

6. The combination defined in claim 5 wherein said discriminating means further includes a decoder connected to said pulse counter, said decoder having a blocking input connected to an output of said first integrator for deactivating said decoder at all times except during said guard intervals, said pulse counter being provided with a resetting input connected to an output of said second integrator.

7. The combination defined in claim 5 wherein the monitoring units of at least said first ($k$-1) relay stations include each a local oscillator connected to said output means for transmitting an outgoing carrier wave to the next relay station and a modulator inserted between said local oscillator and said output means for amplitude-modulating said outgoing carrier wave with the replicas of said identification pulses under the control of said regenerating circuitry.

8. The combination defined in claim 1 wherein said test code is a series of bits including a predetermined number of consecutive zeroes, said receiving means comprising a first timing network for detecting an all-zero sequence within a period ranging between predetermined time limits and a second timing network in cascade with said first timing network for detecting a recurrence rate of said all-zero sequence ranging between predetermined frequency limits.

9. The combination defined in claim 8 wherein said second timing network includes a retriggerable monoflop generating output pulses of fixed duration which merge into a continuous signal upon said recurrence rate exceeding the upper one of said frequency limits, said receiving means further comprising an alternating-current coupler downstream of said second timing network for blocking the transmission of said continuous signal and a third timing network in series with said coupler for operating said loop-closing means only in response to a repetition frequency of said output pulses exceeding the lower one of said frequency limits.

10. The combination defined in claim 1 wherein each monitoring unit includes a sine-wave generator producing said priming signal under the control of said discriminating means.

* * * * *